United States Patent
Pai et al.

(10) Patent No.: US 11,057,126 B2
(45) Date of Patent: Jul. 6, 2021

(54) TEST SYSTEM AND METHOD OF TESTING FOLLOWER JAMMER ROBUSTNESS OF A RADIO

(71) Applicant: Rohde & Schwarz GmbH & Co. KG, Munich (DE)

(72) Inventors: Klaus Pai, Munich (DE); Erich Grasberger, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 16/717,891

(22) Filed: Dec. 17, 2019

(65) Prior Publication Data
US 2020/0204274 A1 Jun. 25, 2020

(30) Foreign Application Priority Data
Dec. 19, 2018 (EP) .................................... 18214222

(51) Int. Cl.
*H04B 17/26* (2015.01)
*H04B 17/29* (2015.01)
*H04B 17/391* (2015.01)
*H04K 3/00* (2006.01)

(52) U.S. Cl.
CPC ............ *H04B 17/26* (2015.01); *H04B 17/29* (2015.01); *H04B 17/3911* (2015.01); *H04K 3/46* (2013.01)

(58) Field of Classification Search
CPC .......................... H04B 17/0085; H04B 17/26; H04B 17/3911; H04B 17/0087; H04B 2001/0408; H04B 17/29; H04B 17/15; H04B 17/14; H04B 17/16; H04B 17/104; H04B 17/12;

(Continued)

(56) References Cited

U.S. PATENT DOCUMENTS

| 4,991,165 A * | 2/1991 | Cronyn | .................... G01S 7/038 370/278 |
| 6,236,363 B1 * | 5/2001 | Robbins | ................. H01Q 3/267 342/169 |
| 9,621,201 B1 * | 4/2017 | Peric | ...................... H04B 17/10 |

(Continued)

FOREIGN PATENT DOCUMENTS

| CN | 203466825 U | 3/2014 |
| CN | 106888060 A | 6/2017 |

(Continued)

OTHER PUBLICATIONS

Felstead, E. B., "Follower Jammer Considerations for Frequency Hopped Spread Spectrum," IEEE Military Communications Conference, pp. 474-478, Nov. 1998.

*Primary Examiner* — Khanh C Tran
(74) *Attorney, Agent, or Firm* — Christensen O'Connor Johnson Kindness PLLC

(57) ABSTRACT

A test system for testing follower jammer robustness of a radio is described. The test system comprises a signal analyzer and a signal generator that are connected with each other via a communication connection. The signal analyzer is configured to record a radio communication signal and to convert the recorded radio communication signal to a processing signal that is compatible for the communication connection. The signal generator is configured to add at least one delayed signal to the processing signal. Further, a method of testing follower jammer robustness of a radio is described.

17 Claims, 1 Drawing Sheet

(58) Field of Classification Search
CPC ........ H04B 17/24; H04B 7/0413; H04K 3/46; H04W 24/00; H04L 43/50
See application file for complete search history.

(56) References Cited

U.S. PATENT DOCUMENTS

| | | | | |
|---|---|---|---|---|
| 10,097,282 | B1* | 10/2018 | Chao | H04B 17/27 |
| 2007/0041006 | A1* | 2/2007 | Abbott | H04B 10/071 |
| | | | | 356/73.1 |
| 2010/0136925 | A1* | 6/2010 | Lackey | H04B 1/123 |
| | | | | 455/77 |
| 2010/0136941 | A1* | 6/2010 | Lackey | H04B 1/525 |
| | | | | 455/307 |
| 2011/0212692 | A1* | 9/2011 | Hahn | H04B 1/52 |
| | | | | 455/63.1 |
| 2013/0308940 | A1* | 11/2013 | Kpodzo | H04B 10/2575 |
| | | | | 398/39 |
| 2014/0254647 | A1* | 9/2014 | Stott | H04L 43/12 |
| | | | | 375/224 |
| 2017/0019274 | A1* | 1/2017 | Liu | H04L 25/08 |
| 2017/0227623 | A1* | 8/2017 | Park | H04B 7/0617 |

FOREIGN PATENT DOCUMENTS

| | | |
|---|---|---|
| EP | 3399674 A1 | 11/2018 |
| JP | H07212324 A | 8/1995 |

* cited by examiner

TEST SYSTEM AND METHOD OF TESTING FOLLOWER JAMMER ROBUSTNESS OF A RADIO

FIELD OF THE DISCLOSURE

Embodiments of the present disclosure generally relate to a test system as well as a method of testing follower jammer robustness of a radio.

BACKGROUND

Radio systems or radio devices, hereinafter radios, are typically tested to determine their respective characteristics with respect to the intended application of the radios. In certain applications, the robustness against follower jammer is one of the characteristics that is of interest.

In general, a follower jammer may be used to disturb certain communication signals. For instance, every single burst of a signal such as a radio frequency signal (RF signal) is detected by the follower jammer wherein a jamming signal is outputted that follows the respective burst so as to interfere with the respective signal. The signals that comprise several bursts may correspond to so-called frequency hopping (FH) communication signals which generally relate to a frequency hopping spread spectrum (FHSS).

Even though modern jammer technologies ensure that other communication signals are not disturbed by the respective follower jammer, the robustness of certain radios against follower jammer is a characteristic that is of high interest.

So far, a radio is manually tested in order to test its follower jammer robustness while follower jammers are generated manually. However, these tests are time consuming and the results of the tests are not reproducible so that it is hard to determine the follower jammer robustness of a certain radio under test in a reliable manner. Moreover, several radios under test cannot be compared with each other due to the missing reproducibility of the test results.

Accordingly, there is a need for a possibility to test follower jammer robustness of a radio in a cost-efficient and reliable manner.

SUMMARY

Embodiments of the present disclosure provide a test system for testing follower jammer robustness of a radio. The test system, in some embodiments, comprises a signal analyzer and a signal generator that are connected with each other via a communication connection. The signal analyzer is configured to record a radio communication signal and to convert the recorded radio communication signal to a processing signal that is compatible for the communication connection. The signal generator is configured to add at least one delayed signal to the processing signal.

Further, embodiments of the present disclosure provide a method of testing follower jammer robustness of a radio. The method, according to some embodiments, comprise the following steps:

providing a signal analyzer and a signal generator;
connecting the signal analyzer to the signal generator via a communication connection;
recording a radio communication signal via the signal analyzer;
converting the recorded radio communication signal to a processing signal that is compatible for the communication connection; and
adding at least one delayed signal to the processing signal via the signal generator.

Accordingly, a delayed signal is added to the processing signal that corresponds to the previously recorded radio communication signal. The system as well as the method relate to testing follower jammer since the radio communication signal is used wherein this signal is added with a defined delayed signal. Therefore, it is possible to test follower jammer robustness of a radio in an automatic, defined and reproducible (repeatable) manner.

The signal analyzer receives and analyzes the radio communication signal to obtain the processing signal that is forwarded to the signal generator so that the signal generator outputs a testing signal that corresponds to the at least one delayed signal as well as the processing signal. In other words, the signal generator is controlled by the signal analyzer, for example the processing signal outputted by the signal analyzer. Hence, the signal generator is controlled in real time, for instance modulated by the processing signal received from the signal analyzer. Accordingly, the signal generator adds at least one delayed signal to the processing signal that corresponds to the originally received radio communication signal.

The testing signal outputted by the signal generator corresponds to a superposed signal comprising a reproduction of the originally received radio communication signal as well as the delayed signal added. In some embodiments, the testing signal is a superposed signal that consists of a reproduction of the originally received radio communication signal and the delayed signal that is added thereto. Put it another way, the delayed signal superimposes the reproduction of the originally received radio communication signal generated by the signal generator based on the processing signal received.

A complete frequency hopping scenario of the waveform(s) used, for instance High Data Rate Anti-Jam (HDR-AJ) waveforms, can be forwarded to the radio, also called device under test or radio under test. In addition, the respective frequency hopping scenario may be analyzed by the signal analyzer. The signal generator may be controlled based on the analysis result of the signal analyzer.

In general, delay is the main parameter for testing follower jammer (robustness) of a radio. Therefore, the at least one delayed signal is delayed by a certain delay with respect to the radio communication signal or rather its reproduction.

The delayed signal may correspond to the original radio communication signal that is delayed by the delay.

An aspect provides that the signal generator comprises an operator interface via which the operator is enabled to adjust a delay and/or to predetermine a delay for the at least one delayed signal. Put it another way, a delay for the at least one delayed signal is adjusted and/or predetermined manually. In some embodiments, the operator is enabled to set the respective settings of the test system for testing follower jammer robustness of the radio. In some embodiments, the at least one delayed signal is adjusted by setting the delay of this signal via the operator interface.

Moreover, the signal generator may be configured to receive the processing signal via the communication connection. In other words, the processing signal is forwarded to the signal generator via the communication connection. Hence, the signal analyzer outputs the processing signal in a format which ensures that the processing signal can be forwarded to the signal generator via the communication connection that is established between the signal analyzer and the signal generator. As already mentioned, the signal analyzer controls the signal generator since the signal generator is generally configured to, inter alia, reproduce the original radio communication signal by taking the received processing signal into account. In addition, the signal generator is configured to add the delayed signal to the reproduced radio communication signal.

According to an embodiment, the signal generator is configured to add fading to the processing signal and/or the at least one delayed signal. In other words, the recorded radio communication signal and/or the at least one delayed signal is faded. Hence, the testing signal outputted by the signal generator may be faded. In other words, the attenuation of the testing signal is varied, for example the one of the at least one delayed signal or the processing signal, namely the reproduction of the radio communication signal. Certain fading models or fading profiles may be applied by the test system, for example the signal generator, so as to test certain scenarios. For instance, a Rayleigh fading may be used.

In general, the processing signal that corresponds to the radio communication signal is delayed by a desired jammer delay, namely the one set by the operator via the operator interface. Thus, bursts assigned to the radio communication signal can be distorted by defined time delays, namely the ones set by the user or operator.

For instance, several paths of a fading unit, for instance a fading simulator, may be used that are delayed with respect to each other. Additionally, Rayleigh fading may be applied in some embodiments.

Generally, the signal analyzer and the signal generator together establish the fading unit or rather the fading simulator. The respective fading unit or fading simulator may have a bandwidth higher than 100 MHz in some embodiments.

In addition to fading, noise and/or interference modulation may be added by the signal generator. Hence, the wanted signal, namely the originally transmitted radio communication signal, is disturbed in an appropriate manner for testing purposes.

A transmitting radio may be provided that is connected to an input of the signal analyzer. The transmitting radio may provide the radio communication signal that is recorded by the signal analyzer in an appropriate manner Hence, the transmitting radio is configured to provide the wanted signal with a waveform assigned to a certain frequency hopping scenario.

The transmitting radio may correspond to a reference device that is connected with the radio (under test) via a communication link provided by the test system. Thus, the transmitting radio provides the radio communication signal having the respective waveform which is analyzed by the signal analyzer and inter alia reproduced by the signal generator for testing the radio (under test).

An aspect provides that the test system comprises at least one amplitude adjustment member that is connected between the transmitting radio and the signal analyzer. The amplitude adjustment member may be an attenuator that attenuates the amplitude of the radio communication signal in a desired manner. In other words, the at least one amplitude adjustment member is interposed between the transmitting radio and the signal analyzer.

Furthermore, a receiving radio may be provided that is connected to an output of the signal generator. The receiving radio may correspond to the radio under test which follower jammer robustness shall be tested by the test system. For instance, the receiving radio is selected to match with the transmitting radio. Put it another way, the transmitting radio and the receiving radio correspond to a radio system used in real application.

Generally, the follower jammer robustness of the transmitting radio may also be tested by the test system by analyzing the respective signals.

Accordingly, a receiving radio may be connected to an output of the signal generator and/or a transmitting radio may be connected to an input of the signal analyzer. The test system can be used for different combinations of radio systems wherein a radio system comprises at least a transmitting radio and a receiving radio that matches with the transmitting radio.

In some embodiments, the test system comprises at least one amplitude adjustment member that is connected between the receiving radio and the signal generator. Hence, the amplitude of the testing signal, namely the reproduced radio communication signal superimposed with the at least one delayed signal, is also adjusted with regard to its amplitude. For instance, the at least one amplitude adjustment member that is interposed between the receiving radio and the signal generator corresponds to an attenuator that attenuates the amplitude of the testing signal.

The communication connection may be a digital communication connection, an analog communication connection and/or an IQ data communication connection. Therefore, the processing signal that is forwarded from the signal analyzer to the signal generator may be a digital one, an analog one or rather IQ data that is processed by the signal generator in an appropriate manner to generate the testing signal used for testing follower jammer robustness of the radio under test, namely the receiving radio.

In addition, the signal analyzer may be configured to receive the radio communication signal via a cable connection and/or a wireless connection. Accordingly, the transmitting radio may be connected to the signal analyzer via a cable or in a wireless manner so that an over-the-air (OTA) measurement can be performed.

The above mentioned aspects apply to the test system and the method in a similar manner.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
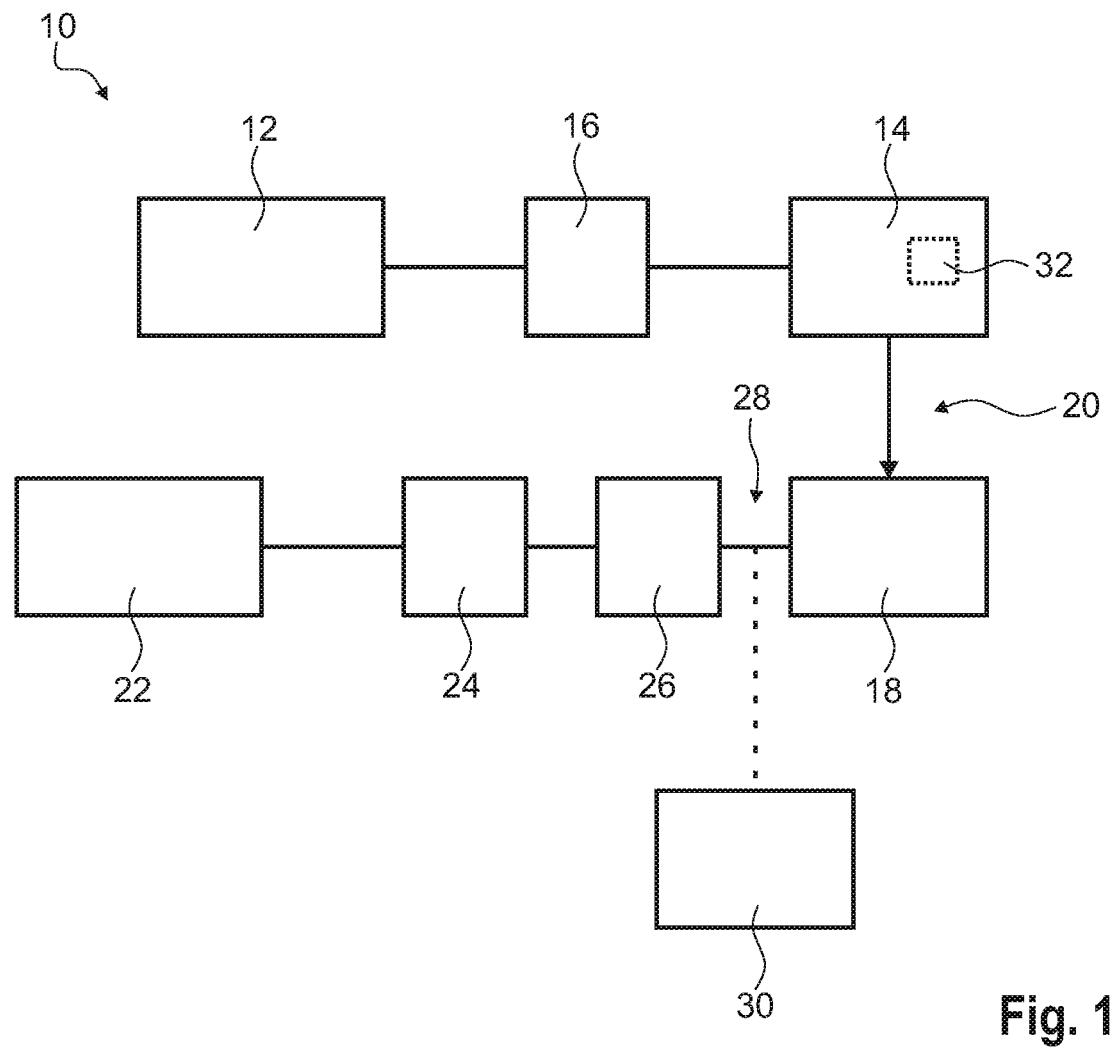
FIG. 1 schematically shows a representative embodiment of a test system according to the present disclosure.

In FIG. 1, a test system 10 for testing follower jammer robustness is shown. The test system 10 comprises a transmitting radio 12 that is connected with a signal analyzer 14 wherein, for example, a first amplitude adjustment member 16 is interconnected between the transmitting radio 12 and the signal analyzer 14.

The signal analyzer 14 is connected with a signal generator 18 via a communication connection 20. In the shown embodiment, the communication connection 20 is established by an IQ data communication connection. Thus, the signal analyzer 14 forwards an IQ data signal to the signal generator 18 for controlling the signal generator 18, for example an output signal of the signal generator 18.

The signal generator 18 is connected with a receiving radio 22 wherein, for example, a second amplitude adjustment member 24 is interconnected between the receiving radio 22 and the signal generator 18.

The test system 10 also comprises in some embodiments an additional switchable, mechanical step attenuator 26 as well as a power splitter or rather a power combiner 28 which are interconnected between the signal generator 18 and the receiving radio 22, for example between the signal generator 18 and the second amplitude adjustment member 24. Via the power splitter or rather power combiner 28, a signal source analyzer 30 may be connected to receive the outputted signal of the signal generator 18 for analyzing purposes.

In general, the signal analyzer 14, which may be established as a spectrum analyzer, and the signal generator 18 may be established by two separately formed devices. Alternatively, the signal analyzer 14 and the signal generator 18 may be established by a common device so that both the signal analyzer 14 and the signal generator 18 are housed in a common housing.

Figure 2:
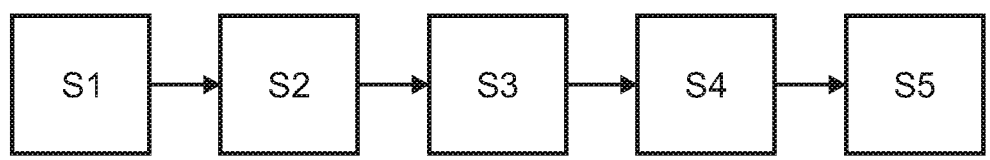
FIG. 2 shows a schematic flow-chart of a representative method of testing follower jammer robustness of a radio according to the present disclosure.

In the shown embodiment, the receiving radio 22 is the radio under test of which follower jammer robustness shall be tested by using the test system 10 as will be described hereinafter with reference to FIG. 2 showing a flow-chart illustrating a method of testing follower jammer robustness.

In a first step S1, the test system 10 is provided, namely the components of the test system 10. In some embodiments, the signal analyzer 14 and the signal generator 18 are provided.

In a second step S2, the components of the test system 10 are connected with each other as shown in the embodiment of FIG. 1.

Accordingly, the signal analyzer 14 and the signal generator 18 are connected with each other via the communication connection 20. Further, the transmitting radio 12 is connected with an input of the signal analyzer 14 and the receiving radio 22 is connected with an output of the signal generator 18, respectively.

In a third step S3, the transmitting radio 12 transmits a radio communication signal that is attenuated via the first amplitude adjustment member 16 so that an attenuated radio communication signal is recorded by the signal analyzer 14.

In a fourth step S4, the signal analyzer 14 analyzes and converts the recorded radio communication signal to a processing signal that is compatible for the communication connection 20 established between the signal analyzer 14 and the signal generator 18.

In the shown embodiment, the signal analyzer 14 demodulates the received radio communication signal into an IQ (data) signal that is used to modulate the signal generator 18 in real time to output a testing signal used for testing the receiving radio 22.

In a fifth step S5, the signal generator 18 generates and adds at least one delayed signal to the processing signal.

In some embodiments, the signal generator 18 generates a reproduction of the original radio communication signal that was received by the signal analyzer 14 wherein the signal generator 18 processes the processing signal received.

In other words, the at least one delayed signal is added to the reproduced radio communication signal that was originally transmitted by the transmitting radio 12 and received by the signal analyzer 14.

The signal generator 18 and the signal analyzer 14 together may form a fading module that is used to delay the radio communication signal by a desired jammer delay which may be set by an operator of the test system via an operator interface 32. In some embodiments, the test system 10 or rather the signal generator 18 is configured to add fading to the processing signal and/or the at least one delayed signal. Anyway, the testing signal may be faded.

Thus, the operator is enabled to adjust and/or to predetermine the delay of the at least one delayed signal via the operator interface 32.

In the shown embodiment, the operator interface 32 is assigned to the signal generator 18. However, the operator interface 32 may be assigned to the test system 10 in general.

In some embodiments, the radio communication signal transmitted by the transmitting radio 12 may comprise several bursts that are interfered by the defined delay.

In order to ensure that the wanted signal is interfered in a desired manner, several, for instance 15, paths of a fading module may be used wherein the paths are delayed with respect to each other. In addition, Rayleigh fading may be applied in some embodiments to ensure that the wanted signal is interfered in the desired manner.

The signal generator 18 outputs a testing signal that corresponds to the originally transmitted radio communication signal and the at least one delayed signal added. Hence, the testing signal that is output by the signal generator 18 is a superimposition of the radio communication signal reproduced by the signal generator 18 from the processing signal, namely the IQ data received, and the at least one delayed signal.

Accordingly, the whole frequency hopping scenario of the originally transmitted radio communication signal is forwarded via the testing signal.

The testing signal may be varied with regard to its level or rather amplitude by the at least one second amplitude adjustment member 24 or rather the step attenuator 26 which are interconnected between the signal generator 18 and the receiving radio 22.

The testing signal is forwarded to the radio under test, namely the receiving radio 22, to test its follower jammer robustness.

In general, a testing signal is generated that corresponds to the original radio communication signal so that the whole frequency hopping scenario is forwarded to the radio under test, namely the receiving radio 22.

Moreover, the respective test system 10 is configured to perform the method of testing follower jammer robustness in an automatic, defined and repeatable manner wherein a defined delay for the at least one delayed signal may be set by the operator of the test system 10 via the operator interface 32.

Alternatively to the shown embodiment, the communication connection 20 may be established by a digital communication connection or an analog communication connection.

Furthermore, the transmitting radio 12 may be connected with the signal analyzer 14 in a wireless manner or via a cable so that the signal analyzer 14 is configured to receive the radio communication signal via at least one of a cabled connection and a wireless connection.

Certain embodiments disclosed herein utilize circuitry (e.g., one or more circuits) in order to implement protocols, methodologies or technologies disclosed herein, operably couple two or more components, generate information, process information, encode signals, decode signals, transmit and/or receive signals, etc. Circuitry of any type can be used. For example, as described above, the test system 10, the transmitting radio 12, the signal analyzer 14, the signal generator 18, the receiving radio 22, the power combiner 28, the signal source analyzer 30, the operator interface 32 or other components of the system may include, in some embodiments, logic for implementing the protocols, technologies and methodologies described herein. This logic of these components can be carried out in circuitry that includes, for example, hardware or a combination of hardware and software. In some embodiments, logic of these components is carried out in software.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof.

In an embodiment, circuitry includes one or more ASICs having a plurality of predefined logic components. In an embodiment, circuitry includes one or more FPGA having a plurality of programmable logic components. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes an implementation comprising one or more processors or portions thereof and accompanying software, firmware, hardware, and the like.

In an embodiment, circuitry includes a baseband integrated circuit or applications processor integrated circuit or a similar integrated circuit in a server, a broadcast/streaming device, such as for example a cellular network device, an OTA network device, an OTT network device, a satellite network device, an internet protocol device, etc., and other network devices, or other computing devices. In an embodiment, circuitry includes one or more remotely located components. In an embodiment, remotely located components are operably coupled via wireless communication. In an embodiment, remotely located components are operably coupled via one or more receivers, transmitters, transceivers, or the like.

In an embodiment, circuitry includes one or more memory devices that, for example, store instructions or data. Non-limiting examples of one or more memory devices include volatile memory (e.g., Random Access Memory (RAM), cache memory, register memory, etc.), non-volatile memory (e.g., Read-Only Memory (ROM), flash drives, solid-state drives, etc.), or the like. It will be appreciated that where embodiments are described to use a computer-readable storage medium, other types of computer-readable storage media may be substituted for or used in addition to the computer-readable storage media described above.

The computer-readable media include cooperating or interconnected computer-readable media, which exist exclusively on a processing system or distributed among multiple interconnected processing systems that may be local to, or remote from, the processing system. The one or more memory devices can be coupled to, for example, one or more computing devices by one or more instructions, data, or power buses.

In an embodiment, circuitry may also include a computer-readable media drive configured to accept signal-bearing medium (e.g., computer-readable memory media, computer-readable recording media, or the like). In an embodiment, a program for causing a system or device to execute any of the disclosed methods can be stored on, for example, a computer-readable recording medium (CRMM), a signal-bearing medium, or the like.

It will be appreciated that one or more aspects of the methods set forth herein can be carried out in a computer system. In this regard, a program element is provided, which is configured and arranged when executed on a computer to carry out protocols, methodologies or technologies disclosed herein. The program element may be installed in memory, such as computer readable storage medium described above. The computer readable storage medium and the program element, which may comprise computer-readable program code portions embodied therein, may further be contained within a non-transitory computer program product.

As mentioned, various embodiments of the present disclosure may be implemented in various ways, including as non-transitory computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media, for example, as described above).

As should be appreciated, various embodiments of the present disclosure may be implemented as methods, apparatus, systems, computing devices, computing entities, and/or the like, as have been described elsewhere herein or claimed below. As such, embodiments of the present disclosure may take the form of an apparatus, system, computing device, computing entity, and/or the like executing instructions stored on a computer-readable storage medium to perform certain steps or operations. However, embodiments of the present disclosure may also take the form of an entirely hardware embodiment performing certain steps or operations.

Various embodiments are described above with reference to block diagrams and/or flowchart illustrations of apparatuses, methods, systems, and computer program products. It should be understood that one or more blocks (or each block) of any of the block diagrams and/or flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks and/or carry out the methods described herein.

These computer program instructions may also be stored in a computer-readable memory, such as the computer-readable storage media described above, that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks and/or carry out the methods described herein. It will be appreciated that the term computer or computing device can include, for example, any computing device or processing structure, circuitry, etc., including but not limited to those described above regarding circuitry.

Accordingly, blocks of the block diagrams and/or flowchart illustrations support various combinations for performing the specified functions, combinations of operations for performing the specified functions and program instructions for performing the specified functions. Again, it should also be understood that each block of the block diagrams and flowchart illustrations, or combinations of blocks in the block diagrams and/or flowchart illustrations, could be implemented by special purpose hardware-based computer systems or circuits, etc., that perform the specified functions or operations, or combinations of special purpose hardware and computer instructions.

According to some embodiments, many individual steps of a process may or may not be carried out utilizing the computer systems described herein, and the degree of computer implementation may vary, as may be desirable and/or beneficial for one or more particular applications.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" means "A and/or B", namely "A" alone, "B" alone or "A and B". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A test system for testing follower jammer robustness of a radio, comprising:
a signal analyzer and a signal generator that are connected with each other via a communication connection, wherein the signal analyzer is configured to record a radio communication signal, to analyze the radio communication signal, and to convert the recorded radio communication signal to a processing signal that is compatible for the communication connection, wherein the signal generator is configured to add at least one delayed signal to the processing signal such that the signal generator outputs a testing signal that corresponds to the at least one delayed signal and the processing signal, thereby enabling the test system to test follower jammer robustness.

2. The test system according to claim 1, wherein the signal generator comprises an operator interface via which the operator is enabled to adjust a delay.

3. The test system according to claim 1, wherein the signal generator comprises an operator interface via which the operator is enabled to predetermine a delay for the at least one delayed signal.

4. The test system according to claim 1, wherein the signal generator is configured to receive the processing signal via the communication connection.

5. The test system according to claim 1, wherein the signal generator is configured to add fading to the processing signal.

6. The test system according to claim 1, wherein the signal generator is configured to add fading to the at least one delayed signal.

7. The test system according to claim 1, wherein a transmitting radio is provided that is connected to an input of the signal analyzer.

8. The test system according to claim 7, wherein the test system comprises at least one amplitude adjustment member that is connected between the transmitting radio and the signal analyzer.

9. The test system according to claim 1, wherein a receiving radio is provided that is connected to an output of the signal generator.

10. The test system according to claim 9, wherein the test system comprises at least one amplitude adjustment member that is connected between the receiving radio and the signal generator.

11. The test system according to claim 1, wherein the communication connection is at least one of a digital communication connection, an analog communication connection and an IQ data communication connection.

12. The test system according to claim 1, wherein the signal analyzer is configured to receive the radio communication signal via at least one of a cabled connection and a wireless connection.

13. A method of testing follower jammer robustness of a radio, comprising:
providing a signal analyzer and a signal generator;
connecting the signal analyzer to the signal generator via a communication connection;
recording a radio communication signal via the signal analyzer;

analyzing the radio communication signal via the signal analyzer;
converting the recorded radio communication signal to a processing signal that is compatible for the communication connection;
adding at least one delayed signal to the processing signal via the signal generator; and
outputting a testing signal that corresponds to the at least one delayed signal and the processing signal via the signal generator, thereby enabling the test system to test follower jammer robustness.

14. The method according to claim 13, wherein the processing signal is forwarded to the signal generator via the communication connection.

15. The method according to claim 13, wherein a delay for the at least one delayed signal is adjusted and/or predetermined manually.

16. The method according to claim 13, wherein the recorded radio communication signal and/or the at least one delayed signal is faded.

17. The method according to claim 13, wherein a receiving radio is connected to an output of the signal generator and/or a transmitting radio is connected to an input of the signal analyzer.

* * * * *